US009091579B2

(12) United States Patent
Gaal et al.

(10) Patent No.: US 9,091,579 B2
(45) Date of Patent: Jul. 28, 2015

(54) FLOW SENSOR (71) Applicant: E+E Electronik Ges.m.b.H, Engerwitzdorf (AT)

(72) Inventors: Martin Gaal, Villach (AT); Mathias Rohm, Pöstlingberg (AT); Stefan Polly, Unterweißenbach (AT); Georg Niessner, Katsdorf (AT)

(73) Assignee: E+E ELEKTRONIK GES.M.B.H., Engerwitzdorf (AT)

( * ) Notice: Subject to any disclaimer, the term of this patent is extended or adjusted under 35 U.S.C. 154(b) by 196 days.

(21) Appl. No.: 13/890,619

(22) Filed: May 9, 2013

(65) Prior Publication Data
US 2013/0298666 A1 Nov. 14, 2013

(30) Foreign Application Priority Data

May 11, 2012 (DE) .......................... 10 2012 009 421

(51) Int. Cl.
*G01F 1/68* (2006.01)
*G01F 1/684* (2006.01)
*G01F 1/74* (2006.01)

(52) U.S. Cl.
CPC .............. *G01F 1/684* (2013.01); *G01F 1/6842* (2013.01); *G01F 1/74* (2013.01)

(58) Field of Classification Search
CPC .......... G01F 1/684; G01F 1/6842; G01F 1/74
USPC .............................. 73/204.15, 204.16, 204.26
See application file for complete search history.

(56) References Cited

U.S. PATENT DOCUMENTS

| | | | | |
|---|---|---|---|---|
| 4,214,478 A * | 7/1980 | Lauterbach | ................. | 73/204.15 |
| 4,986,122 A * | 1/1991 | Gust | ........................... | 73/204.15 |
| 5,396,795 A * | 3/1995 | Araki | .......................... | 73/204.26 |
| 6,253,606 B1 * | 7/2001 | Yonezawa et al. | ......... | 73/204.26 |
| 6,393,907 B1 | 5/2002 | Yamakawa et al. | | |
| 6,679,114 B2 * | 1/2004 | Yamakawa | ................. | 73/204.26 |
| 6,820,479 B2 * | 11/2004 | Roeckel et al. | .............. | 73/202.5 |
| 7,404,321 B2 * | 7/2008 | Tanaka et al. | .............. | 73/204.26 |

(Continued)

FOREIGN PATENT DOCUMENTS

| | | |
|---|---|---|
| DE | 199 41 330 A1 | 10/2000 |
| DE | 10 2005 016 122 A1 | 10/2006 |
| DE | 10 2007 055 779 A1 | 6/2008 |

OTHER PUBLICATIONS

Search Report for corresponding European Patent Application 13 00 1841.

*Primary Examiner* — Lisa Caputo
*Assistant Examiner* — Jonathan Dunlap
(74) *Attorney, Agent, or Firm* — Brinks Gilson & Lione (57) ABSTRACT

A flow sensor for direct measurement of mass flow that includes a rigid, electrically conductive carrier part and a sensor element that is connected to the carrier part via electrically conductive connections. The sensor element includes a plate-like carrier substrate on which a temperature sensor and a heating element are disposed. The sensor element also includes a stable encapsulation, which partially surrounds the sensor element and the carrier part in form-locking fashion. The sensor element also includes a first region on a top side of the sensor element that is not covered by the encapsulation and a second region of an underside of said sensor element that is not covered by the encapsulation. The mass flow to be measured can circulate around the first region and the second region without hindrance.

14 Claims, 5 Drawing Sheets

(56) References Cited

U.S. PATENT DOCUMENTS

| | | | |
|---|---|---|---|
| 7,437,927 B2 * | 10/2008 | Yamada et al. | 73/204.21 |
| 7,942,053 B2 * | 5/2011 | Saito et al. | 73/204.26 |
| 2008/0148842 A1 | 6/2008 | Oda | |

* cited by examiner

FLOW SENSOR

RELATED APPLICATIONS

Applicants claim, under 35 U.S.C. §119, the benefit of priority of the filing date of May 11, 2012 of a German patent application, copy attached, Serial Number 10 2012 009 421.3, filed on the aforementioned date, the entire contents of which is incorporated herein by reference.

BACKGROUND

1. Technical Field

The present invention relates to a flow sensor which is suitable for direct measurement of mass flows, preferably including air or other gases.

2. Background Information

Typically, flow sensors are used in applications in which a defined mass of air or gas per unit of time must be supplied. A typical application is in the intake conduit of internal combustion engines in motor vehicles, for example. The flow sensors used there are placed directly in the flow to be measured so that the flow to be measured circulates around the flow sensors. Known flow sensors are embodied as hot-film sensors and include various sensor windings and optionally heater structures, which are applied via conventional thin-film technology to thin glass or ceramic substrates.

In use, however, such flow sensors prove problematic. First, because of the thin substrates employed, the resultant mechanical sensitivity is high. Second, the flow sensors and substrates, because during production they are cut apart by a sawing process, have edges on which dirt can be deposited in operation, leading to incorrect measurements.

For solving these problems, a flow sensor is proposed in German patent disclosure DE 10 2005 016 122 A1 in which a sensor chip is surrounded, either entirely or partially, by a plastic component. The plastic component can also be embodied in certain regions as a leading edge. In this way, the aforementioned disadvantages in terms of mechanical stability and soiling or contamination are avoided. However, for certain type of sensor elements, the flow to be measured does not circulate around the actual sensor element in an ideal manner.

OBJECTS AND SUMMARY OF THE INVENTION

It is an object of the present invention to disclose a flow sensor in which, besides the best possible mechanical stability and sensitivity to soiling, the best possible circulation of flow around the sensor element is ensured.

This object is attained by a flow sensor for direct measurement of mass flow that includes a rigid, electrically conductive carrier part and a sensor element that is connected to the carrier part via electrically conductive connections. The sensor element includes a plate-like carrier substrate on which a temperature sensor and a heating element are disposed. The sensor element also includes a stable encapsulation, which partially surrounds the sensor element and the carrier part in form-locking fashion. The sensor element also includes a first region on a top side of the sensor element that is not covered by the encapsulation and a second region of an underside of said sensor element that is not covered by the encapsulation. The mass flow to be measured can circulate around the first region and the second region without hindrance.

The flow sensor according to the present invention for direct measurement of mass flows includes:

a rigid, electrically conductive carrier part, a sensor element, which is connected to the carrier part via electrically conductive connections, and the sensor element includes a plate-like carrier substrate on which at least one temperature sensor and a heating element are disposed, and a stable encapsulation, which partially surrounds the sensor element and the carrier part in form-locking fashion, and regions on the top and on the underside of the sensor element are not covered by the encapsulation so that the flow to be measured can circulate the regions without hindrance.

Advantageously, the sensor element extends along a longitudinal axis of the flow sensor, and vertically to the longitudinal axis. On at least one side adjacent to the sensor element, a region of the encapsulation is embodied as a leading edge for the flow to be measured.

It can be provided that on each of the two sides adjacent to the sensor element, a region of the encapsulation is embodied as a leading edge for the flow to be measured, and both regions are embodied mirror-symmetrically to an axis of symmetry of the flow sensor.

The leading edge can have a curved cross section, so that the flow to be measured does not impinge upon any edge on the flow sensor.

In one possible embodiment, on the top and on the underside of the sensor element, each region that is not covered by the encapsulation is embodied as rectangular, and the longitudinal axis of this region extends along the longitudinal axis of the flow sensor.

It is possible that the heating element is disposed in the regions on the top and/or on the underside of the sensor element that are not covered by the encapsulation.

Advantageously, the encapsulation surrounds the electrically conductive connections between the sensor element and the carrier part.

Advantageously, the electrically conductive connections are embodied as bond connections, with bond wires.

It can be provided that the encapsulation does not cover connection regions of the carrier part, via which regions the flow sensor is electrically connectable to a downstream following electronic unit.

In one possible variant, a fastening element that serves to dispose the flow sensor on a retaining element is disposed on one long end of the flow sensor.

A snap hook embodied in the encapsulation can serve as the fastening element.

Advantageously, the encapsulation is embodied of a filled epoxy material.

Advantageously, the carrier substrate of the sensor element includes a material with low heat conduction.

Glass or $ZrO_2$ or LTCC can serve as the material for the carrier substrate.

An especially advantageous feature of the flow sensor is that the flow to be measured circulates around both sides of the sensor element used. By a suitable embodiment of the leading edge, it is possible to optimize the flow guidance toward the sensor element such that the influence of the oncoming flow direction or oncoming flow angle can be minimized.

Furthermore, the at least partial encapsulation provided for the sensor element ensures an enhanced mechanical stability of the flow sensor, and the risk of breakage of the thin carrier substrate during assembly and in use can be minimized markedly.

In the same way, the inventive embodiment of the flow sensor avoids edges that the flow to be measured would strike and on which dirt deposits could settle firmly. Incorrect measurements that would result from such events can thus be avoided.

Further details and advantages of the present invention will be explained in the ensuing description of an exemplary embodiment of the flow sensor of the present invention in conjunction with the drawings.

DETAILED DESCRIPTION OF THE PREFERRED EMBODIMENTS

One exemplary embodiment of the flow sensor of the present invention will be described in detail below, referring to FIGS. 1-5.

The flow sensor of the present invention includes a rigid carrier part 1, which includes an electrically conductive material. Alloy 42, for example, or other materials of the kind used for so-called lead frames in electronic component arrangements, is suitable for this. The carrier part 1, the concrete geometry of which can be seen in the exploded view in FIG. 5, serves both to mechanically stabilize the flow sensor and to connect the sensor element of the flow sensor electrically to a following electronic unit, not shown in the drawings.

The sensor element for measuring the mass flow is identified in the drawings by reference numeral 2 and includes a plurality of components. Among these is a plate-like carrier substrate 2.1 extending in the longitudinal direction of the flow sensor. Suitable materials for the carrier substrate 2.1 are glass, zirconium dioxide ($ZrO_2$), or ceramic materials such as LTCCs (Low Temperature Cofired Ceramics), for example. As shown in the view in FIG. 2 and FIG. 4a, the carrier substrate 2.1 has the form of an elongated rectangle whose longitudinal axis coincides with that of the flow sensor. Both a temperature sensor 5 and a heating element 4 are placed on the carrier substrate 2.1. The temperature sensor 5 and the heating element 4 are both formed by conductor tracks, which are disposed on the carrier substrate 2.1. Both the heating element 4 and the temperature sensor 5 are connected to respective contacting regions 9 or contacting pads. Via the contacting regions 9, an electrically conductive connection 8 of the heating element 4 and of the temperature sensor 5 can each be brought about by finger-like connection regions 1.1-1.4 of the carrier part 1. In the present exemplary embodiment, the electrically conductive connections 8 between the contacting regions 9 of the sensor element 2 and the carrier part 1 are embodied as bond connections having bond wires. Via the finger-like connection regions 1.1-1.4 of the carrier part 1, the flow sensor can finally be connected to a following electronic unit—not shown in the drawings.

Figure 2:
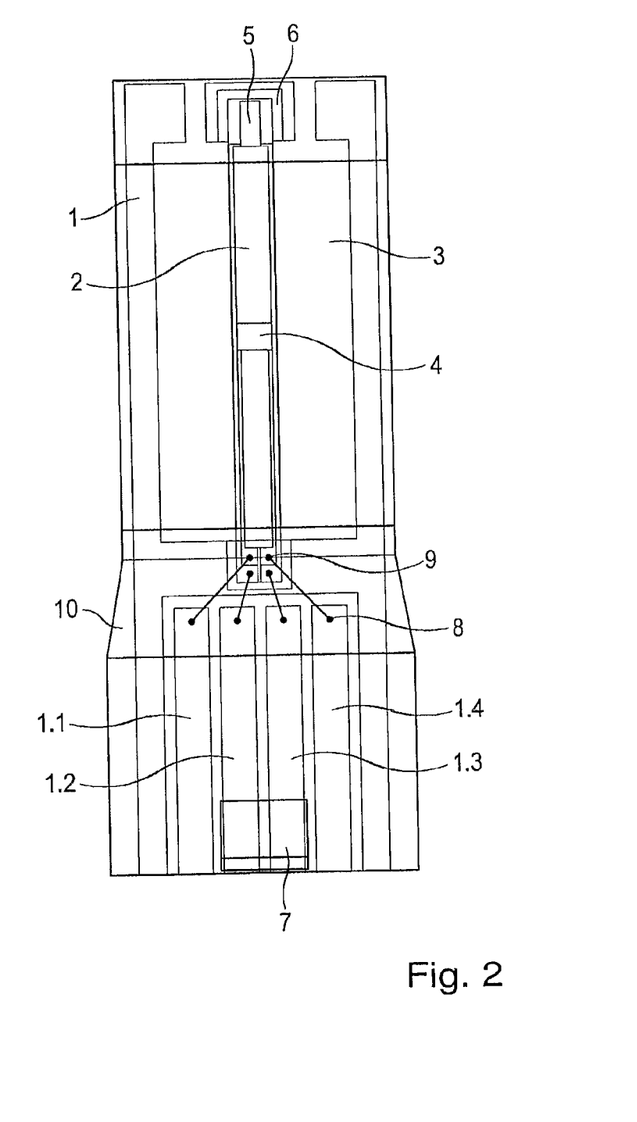
FIG. 2 is a plan view of the flow sensor of FIG. 1.
Figure 3:
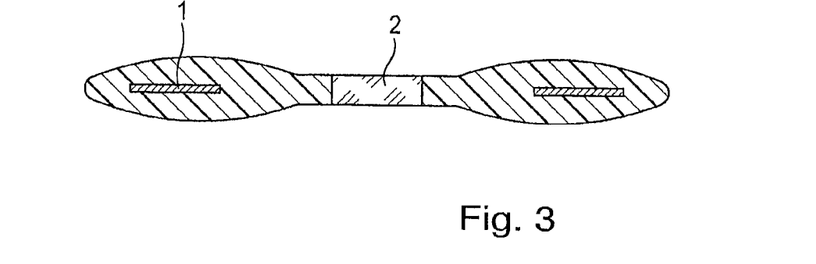
FIG. 3 is a sectional view of the flow sensor of FIG. 1.

In the exemplary embodiment shown, the sensor element 2 or its carrier substrate 2.1 is glued to the carrier part 1. Note that the adhesive 6 used for this is indicated in FIG. 2.

The mass flow measurement itself is done in the flow sensor of the present invention on a hot-film principle, in which the sensor element 2 is placed directly into the flow to be measured so that the flow to be measured circulates over its entire surface. Via the temperature sensor 5 of the sensor element 2, detection of the temperature is performed for the gas whose mass flow is to be measured. The heating element 4 is then heated to a temperature that is above the measured temperature of the flowing gas. The heating power required for this represents a standard for the mass flow of the gas.

Figure 1:
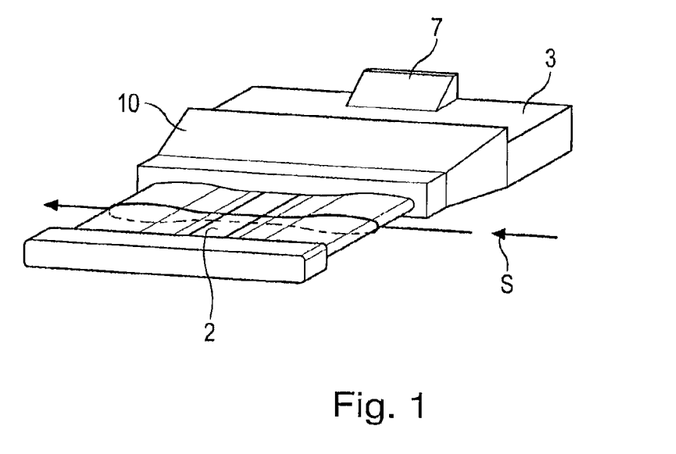
FIG. 1 is a three-dimensional view of an embodiment of a flow sensor in accordance with the present invention, disposed in a schematically indicated flow.

The flow sensor of the present invention furthermore has an encapsulation 3, which partially surrounds the sensor element 2 and the carrier part 1 in form-locking fashion. The encapsulation 3 is embodied here as a so-called molding compound and is connected to the other components of the flow sensor during the production process by a transfer molding method. A filled epoxy resin, for example, may be considered for the material of the encapsulation 3. As fillers, quartz or glass, for example, is suitable. With regard to the sensor element 2, regions on the top and on the underside of the sensor element 2 are definitely not covered by the encapsulation 3. Thus, as indicated in FIG. 1, the flow S to be measured can circulate unhindered around the top side and the underside of the sensor element 2. Each region of the top and of the underside of the sensor element 2 that is not covered by the encapsulation 3 is rectangular, in the example shown. In addition, the longitudinal axes of each of these regions extend along the longitudinal axis of the flow sensor. For that purpose, see also the sectional view in FIG. 3, from which it can be seen that the top and the underside of the sensor element 2 are embodied in a freely exposed fashion, and no encapsulation 3 is provided there. In the present exemplary embodiment, the heating element 4 is disposed in the regions on the top and/or on the underside of the sensor element 2 that are not covered by the encapsulation. As can be seen from the drawings, the temperature sensor 5 placed on the end is covered by the molding compound that includes the encapsulation 3. This is not absolutely necessary for the present invention; that is, the temperature sensor 5 could also be located in such a way that it is not covered by the encapsulation and thus is likewise freely exposed to the flow.

This kind of embodiment of the encapsulation 3 ensures that the flow S to be measured circulates symmetrically around the top and the underside of the sensor element 2, as shown in FIG. 1. Thus, an improved measurement of the mass flow is possible. The mass flow measurement by the flow sensor of the present invention can be optimized still further by disposing an additional cylindrical body—not shown in the drawings—in the flow S upstream of the flow sensor. For positioning such a body and for further optimizing the flow guidance, it can moreover be advantageous to provide a suitably embodied flow housing, in the form of an attachable flow head, around the sensor element 2 as well.

Perpendicular to the longitudinal axis of the sensor element 2, the encapsulation 3 adjoins the sensor element 2 in form-locking fashion on both sides. Laterally adjacent to the sensor element 2, the regions of the encapsulation 3 are embodied as leading edges for the flow S to be measured. In the exemplary embodiment shown, leading edges embodied mirror-symmetrically to an axis of symmetry are provided on both adjacent sides of the sensor element 2. In the vicinity of the sensor element 2, the result is a dumbbell-like cross section of the flow sensor, as shown in the sectional view in FIG. 3. Thus, by way of the appropriate geometrical embodiment of the encapsulation 3 in the vicinity of the leading edges, an optimized flow guidance in the vicinity of the sensor element 2 can be ensured, which markedly minimizes the influence of the oncoming flow direction and of the oncoming flow angle in measuring the mass flow.

In principle, from the standpoint of rheology, it would also be possible to embody the encapsulation as a leading edge on only one side, adjacent to the sensor element. However, the nearly symmetrical embodiment of the flow sensor in this region also proves especially advantageous because any mechanical stresses that arise, which can occur due to different coefficients of expansion of the materials, can be minimized.

The leading edges for the flow S to be measured, which are thus embodied via the encapsulation 3, each have a curved cross-section, which in the present example is approximately elliptical. The shape is approximately equivalent in profile to a symmetrically embodied load-bearing face. In this way, it is ensured that the flow S to be measured does not impinge upon any edge on the flow sensor. In this way, problematic dirt deposits in the vicinity of the sensor element 2 and, thus, possible incorrect measurements can be reliably avoided. In addition, such a shaping of the leading edges ensures that the flow S to be measured sweeps uniformly over the sensor element 2. In other words, the possibility that the sensor element 2 might come to rest in the wind shadow of some obstacle is avoided.

Besides the rheological functionality of the encapsulation 3 in the vicinity of the leading edges, the encapsulation 3 has further important functions for the flow sensor of the present invention as well. For instance, the encapsulation 3 also acts as a mechanical and chemical protection for the sensor element 2, the contacting regions 9 of the sensor element 2, the electrical connections 8, and the carrier part 1.

Moreover, approximately in the middle of the flow sensor, the encapsulation 3 has a positioning portion 10 with a slightly conical shape. In this way, guided and replicable mounting of the flow sensor of the present invention in a given application, where a geometrically complementary counterpart is present, is possible. Any positioning errors during assembly can thus be avoided. The laterally provided oblique faces of the positioning portion 10 can also be used as sealing faces, if the counterpart is suitably embodied.

On one longitudinal end of the flow sensor, a fastening element 7 is also provided, which serves the purpose of detachably disposing the flow sensor on a suitable retaining element—not shown in the drawings. In the present exemplary embodiment, the fastening element 7 is in the form of a snap hook embodied in the encapsulation 3. Thus, the flow sensor can be inserted into a suitable base, for example, and fixed in it.

Figure 4A:
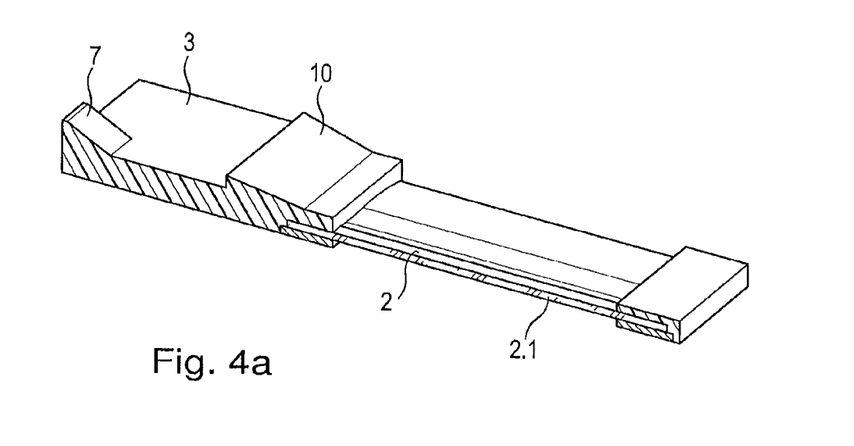
FIGS. 4a-4c each show a three-dimensional sectional view of the flow sensor of FIG. 1.
Figure 4B:
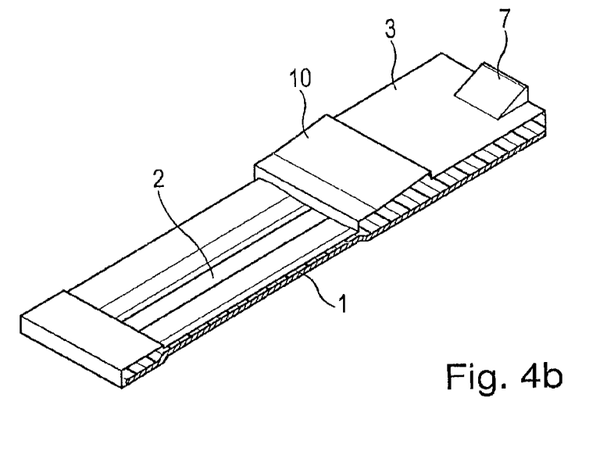
Figure 4C:
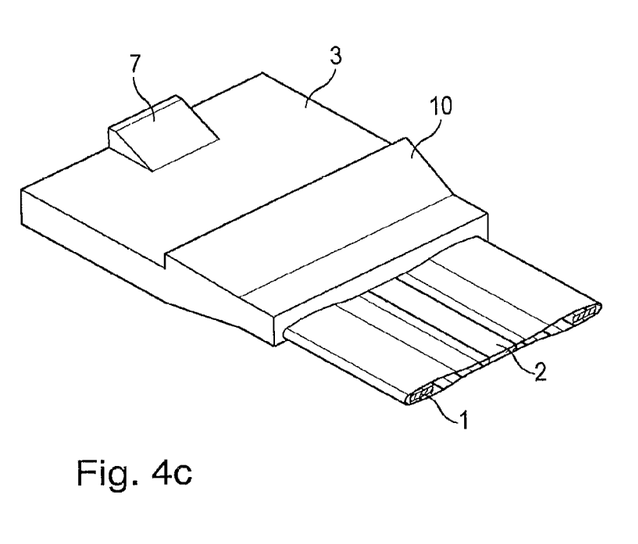
Figure 5:
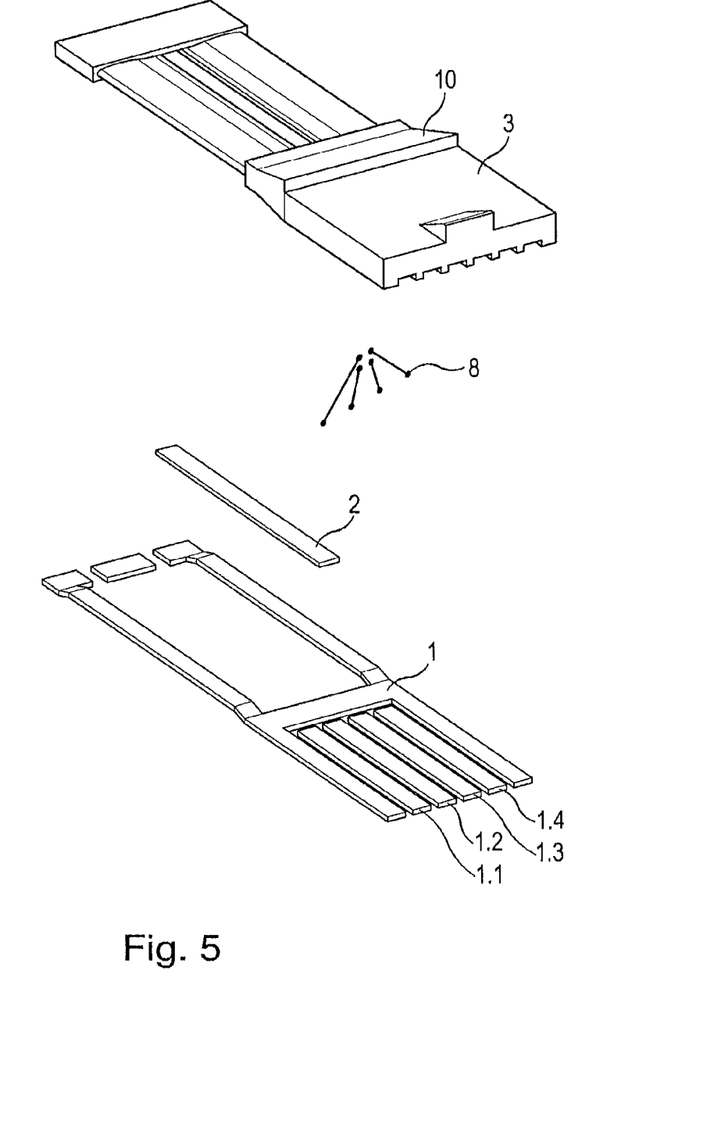
FIG. 5 is an exploded view of the flow sensor of FIG. 1.

As seen in FIGS. 4b and 5, for example, in the vicinity of the finger-like connection regions 1.1-1.4 of the carrier part 1, the encapsulation 3 is provided only above these connection regions 1.1-1.4. This means that the connection regions 1.1-1.4 of the carrier part 1 are freely exposed below and can be used for electrically connecting the flow sensor of the present invention to a following electronic unit. Suitable electrical contacting can be done via a ribbon cable, for example, which is tacked onto the contacting regions 1.1-1.4 via a reflow soldering process.

In selecting the various materials for the flow sensor of the present invention, care must fundamentally be taken to see that materials with low heat conduction, that is, a low coefficient of thermal conductivity $\lambda$, and low thermal capacity c are selected. The relevant parameters of all the materials used must be properly adapted to one another. It also proves advantageous if the materials used do not differ too much in terms of their respective coefficients of thermal expansion CTE.

The relevant orders of magnitude of the parameters for the potential carrier substrate materials, that is, glass, zirconium oxide, the carrier part material Alloy 42, and a suitable encapsulation material (molding compound) are summarized in the table below.

|  | Glass | $ZrO_2$ | Alloy 42 | Molding compound |
|---|---|---|---|---|
| CTE ($\mu$m/K) | 7 | 10 | 5 | 10 |
| Thermal conductivit $\lambda$ (W/Km) | 1 | 2 | 10 | 1 |
| Thermal capacity c (J/gK) | 0.8 | 0.5 | 0.5 | 0.8 |

To manufacture the flow sensor of the present invention, the sensor element 2 is first glued onto the carrier part 1. Next, via a suitable bonding process, the bond connections are made, and in a concluding step, the transfer molding is done.

In addition to the examples described, it is understood that still further possibilities of embodiment exist without departing from the scope of the present invention.

For instance, instead of the single carrier substrate 2.1 of the sensor element 2 provided, it would be possible to embody the carrier element in more than one piece. For instance, the heating element could be disposed on an elongated first carrier substrate, and the temperature sensor could be disposed on a second carrier substrate placed next to the first. In the region between the two carrier substrates, the encapsulation or molding composition would then be disposed, and so forth.

We claim:

1. A flow sensor for direct measurement of mass flow, comprising:
   a rigid, electrically conductive carrier part;
   a sensor element, which is connected to said carrier part via electrically conductive connections, said sensor element comprising a plate-like carrier substrate on which a temperature sensor and a heating element are disposed; and
   a stable encapsulation, which partially surrounds said sensor element and said carrier part in form-locking fashion; and
   wherein said sensor element comprises:
      a first region on a top side of said sensor element that is not covered by said encapsulation;
      a second region of an underside of said sensor element that is not covered by said encapsulation, wherein a mass flow to be measured can circulate around said first region and said second region without hindrance, wherein said sensor element extends along a longitudinal axis of said flow sensor; and
   wherein perpendicular to said longitudinal axis, on a first side adjacent to said sensor element, a first region of said encapsulation adjoins to said sensor element in form-locking fashion and is embodied as a first leading edge for said mass flow to be measured; and
   wherein perpendicular to said longitudinal axis, on a second side adjacent to said sensor element, a second region of said encapsulation adjoins to said sensor element in form-locking fashion and is embodied as a second leading edge for said mass flow to be measured, and both said first region of said encapsulation and said second region of said encapsulation are embodied mirror-symmetrically to an axis of symmetry of said flow sensor.

2. The flow sensor according to claim 1, wherein said leading edge comprises a curved cross-section, so that said mass flow to be measured does not impinge upon any edge on said flow sensor.

3. The flow sensor according to claim 1, wherein on said top side and said underside of said sensor element, each of said first region and said second region that is not covered by said encapsulation is embodied as rectangular, and a longitudinal axis of said first region and a longitudinal axis of said second region each extend along a longitudinal axis of said flow sensor.

4. The flow sensor according to claim 1, wherein said heating element is disposed in said first region and/or said second region.

5. The flow sensor according to claim 1, wherein said encapsulation surrounds said electrically conductive connections between said sensor element and said carrier part.

6. The flow sensor according to claim 5, wherein said electrically conductive connections are embodied as bond connections, with bond wires.

7. The flow sensor according to claim 1, wherein said encapsulation does not cover connection regions of said carrier part, via such connection regions said flow sensor is electrically connectable to a downstream following electronic unit.

8. The flow sensor according to claim 1, wherein a fastening element, which serves to dispose said flow sensor on a retaining element, is disposed on a long end of said flow sensor.

9. The flow sensor according to claim 8, wherein a snap hook embodied in said encapsulation serves as said fastening element.

10. The flow sensor according to claim 1, wherein said encapsulation is embodied of a filled epoxy material.

11. The flow sensor according to claim 1, wherein said plate-like carrier substrate comprises a material with low heat conduction.

12. The flow sensor according to claim 11, wherein said carrier substrate comprises a material selected from the group consisting of glass, $ZrO_2$ and LTCC.

13. The flow sensor according to claim 1, wherein each of said first leading edge and said second leading edge has an approximately elliptical cross-section.

14. A flow sensor for direct measurement of mass flow, comprising:
a rigid, electrically conductive carrier part;
a sensor element, which is connected to said carrier part via electrically conductive connections, said sensor element comprising a plate-like carrier substrate on which a temperature sensor and a heating element are disposed; and
a stable encapsulation, which partially surrounds said sensor element and said carrier part in form-locking fashion; and
wherein said sensor element comprises:
a first region on a top side of said sensor element that is not covered by said encapsulation;
a second region of an underside of said sensor element that is not covered by said encapsulation, wherein a mass flow to be measured can circulate around said first region and said second region without hindrance; and
a fastening element, which serves to dispose said flow sensor on a retaining element, is disposed on a long end of said flow sensor, wherein a snap hook embodied in said encapsulation serves as said fastening element.

* * * * *